United States Patent
Uchida (10) Patent No.: US 8,670,590 B2
(45) Date of Patent: Mar. 11, 2014

(54) IMAGE PROCESSING DEVICE (75) Inventor: Naohide Uchida, Shizuoka (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 435 days.

(21) Appl. No.: 13/057,028

(22) PCT Filed: Jul. 30, 2009

(86) PCT No.: PCT/JP2009/063590
§ 371 (c)(1),
(2), (4) Date: Feb. 1, 2011

(87) PCT Pub. No.: WO2010/013782
PCT Pub. Date: Feb. 4, 2010

(65) Prior Publication Data
US 2011/0135159 A1 Jun. 9, 2011

(30) Foreign Application Priority Data
Aug. 1, 2008 (JP) .................................. 2008-199905

(51) Int. Cl.
G06K 9/00 (2006.01)
(52) U.S. Cl.
USPC ........... 382/103; 382/104; 382/106; 382/107; 382/291
(58) Field of Classification Search
USPC .......................................... 382/103–107, 291
See application file for complete search history.

(56) References Cited

U.S. PATENT DOCUMENTS

| | | | |
|---|---|---|---|
| 6,594,583 B2 * | 7/2003 | Ogura et al. ................... | 701/301 |
| 7,190,282 B2 | 3/2007 | Maemura et al. | |
| 7,266,220 B2 * | 9/2007 | Sato et al. ...................... | 382/104 |
| 7,899,211 B2 * | 3/2011 | Fujimoto ....................... | 382/104 |
| 8,086,046 B2 * | 12/2011 | Fujita ............................. | 382/224 |
| 2003/0210807 A1 * | 11/2003 | Sato et al. ...................... | 382/104 |
| 2006/0078165 A1 * | 4/2006 | Watanabe ...................... | 382/107 |
| 2007/0225933 A1 * | 9/2007 | Shimomura ................... | 702/127 |
| 2012/0019655 A1 * | 1/2012 | Fukamachi et al. .......... | 348/142 |
| 2012/0027258 A1 * | 2/2012 | Uchida et al. ................. | 382/103 |

FOREIGN PATENT DOCUMENTS

| | | |
|---|---|---|
| CN | 1673679 A | 9/2005 |
| JP | 8255250 A | 10/1996 |
| JP | 2007172554 A | 7/2007 |
| JP | 2008026999 A | 2/2008 |
| JP | 2008171141 A | 7/2008 |

* cited by examiner

*Primary Examiner* — Wesley Tucker
(74) *Attorney, Agent, or Firm* — Gifford, Krass, Sprinkle, Anderson & Citkowski, P.C.

(57) ABSTRACT

An image processing device for improving the accuracy of optical flow calculation when an optical flow is calculated in a window unit. An image processing device for calculating an optical flow on the basis of image information within a window for a processing target using a plurality of images captured at different times includes position acquisition means which acquires position information of the processing target and setting means which sets a size of a window for calculating an optical flow on the basis of the position information acquired by the position acquisition means.

4 Claims, 7 Drawing Sheets

| DISTANCE | LATERAL POSITION | SIZE IN IMAGE | SIZE OF OPTICAL FLOW | SIZE OF WINDOW |
|---|---|---|---|---|
| LONG | CLOSE | SMALL | SMALL | SMALL |
| LONG | FAR | SMALL | MEDIUM | MEDIUM |
| SHORT | CLOSE | LARGE | MEDIUM | MEDIUM |
| SHORT | FAR | LARGE | LARGE | LARGE |

Fig.6

IMAGE PROCESSING DEVICE

CROSS-REFERENCE TO RELATED APPLICATION

This application is the national stage of international application PCT/JP2009/063590, filed Jul. 30, 2009, which claims priority of Japanese application no. JP2008-1999905, filed Aug. 1, 2008, both of which are herein incorporated by reference.

TECHNICAL FIELD

The present invention relates to an image processing device for calculating an optical flow on the basis of image information within a window set on an image.

BACKGROUND ART

An optical flow is a vector representing the motion of an object within an image by producing a velocity field of each point (pixel or area) within the image from temporally continuous images. One method for calculating an optical flow uses a gradient technique. By assuming that points within windows set in an image have optical flows with the same size as a constraint, the gradient technique derives a relational expression between a luminance gradient and an optical flow, and calculates the optical flow in a window unit from the relational expression.

However, when objects (for example, a plurality of different moving objects or moving objects and peripheral backgrounds thereof) having different optical flows exist within the same window, optical flow error becomes large. Therefore, a device disclosed in Patent Citation 1 calculates an optical flow of each area (each window) and optical flow error by the gradient technique using a plurality of images obtained from different times, and substituting an optical flow of a peripheral area as an optical flow of a target area when the optical flow error of the target area is greater than the optical flow error of the periphery area on the periphery of the target area.

CITATION LIST

Patent Citation 1 Japanese Patent Application Laid-open No. 2007-172554
Patent Citation 2 Japanese Patent Application Laid-open No. 2008-26999

SUMMARY OF INVENTION

Since a window for calculating an optical flow is set to a uniform size in a related technique, optical flows are calculated from the same size windows for an object located at a short distance and an object located at a long distance. In an image, the object located at the long distance has a smaller size than the object located at the short distance. Therefore, since the window for the object located at the long distance includes a larger number of background pixels than the window for the object located at the short distance, or the object located at the long distance is included in the window for the object located at the short distance, optical flow error calculated from each window may be large. Therefore, in the case of the above-described device, there is a problem in that the optical flow error of a peripheral area may also be large, and there is a possibility that the error may be accumulated when the replacement has been carried out with the optical flow of the peripheral area with the large error.

The present invention is to provide an image processing device for improving the accuracy of optical flow calculation when an optical flow is calculated in a window unit.

According to the present invention, there is provided an image processing device for calculating an optical flow on the basis of image information within a window for a processing target using a plurality of images captured at different times, including: position acquisition means which acquires position information of the processing target; and setting means which sets a size of a window for calculating an optical flow on the basis of the position information acquired by the position acquisition means.

In the image processing device, the position information (for example, a relative distance or lateral position from an image capture position) of the processing target (a target whose motion is detected by the optical flow) is acquired by the position acquisition means. A size of an object on the image is changed in response to a position relationship between the object and the image capture position. A size of the optical flow may also be changed in response to the position relationship between the object and the image capture position. Therefore, the image processing device sets the window size for calculating the optical flow in response to the position information of the processing target by the setting means, and calculates the optical flow for each set window on the basis of the image information within the window. By setting a window having an appropriate size for a processing target in response to the position information of the processing target as described above, the image processing device is able to reduce the effect of error caused by objects other than the processing target included in the window, and improve the accuracy of optical flow calculation. A calculation amount is also able to be reduced since an optical flow is calculated by a window having a size corresponding to the position information of the processing target without performing the optical flow calculation using a uniformly large window.

In the above-described image processing device of the present invention, preferably, the setting means may increase the window size in accordance with the size of a lateral position difference between an image capture position and the processing object.

The optical flow becomes large as a position of a lateral direction is separated from the image capture position. When a small window is set in the case where the optical flow is large, the optical flow does not converge or the optical flow needs to be calculated a number of times by gradually shifting the small window, so that the calculation amount increases. In the image processing device, the setting means is able to set an appropriate window for the size of an optical flow by increasing the window size in accordance with the size of the lateral position difference between the image capture position and the processing target. Consequently, the accuracy of the optical flow calculation may be further improved.

In the above-described image processing device of the present invention, the position acquisition means may be a radar, and may set the processing target on the basis of a detection result of the radar.

In the image processing device, the position information of the processing target is acquired by the radar and the processing target is set from results detected by the radar. The radar is able to accurately acquire the position information. Therefore, since an object exists exactly at a detection position when the detection has been made by the radar, a window for the processing target is set at the position. As described above, the image processing device is able to further reduce a calculation amount by setting a window of the processing target in response to a position detected by the radar and by limiting a processing area of optical flow calculation.

The present invention is able to improve the accuracy of optical flow calculation by setting a window having an appropriate size for a processing target in response to position information of the processing target.

DESCRIPTION OF EMBODIMENTS

Hereinafter, an embodiment of an image processing device according to the present invention will be described with reference to the drawings.

In this embodiment, the image processing device according to the present invention is applied to a periphery monitoring device mounted on a vehicle. The periphery monitoring device according to this embodiment detects obstacles (for example, moving objects such as other vehicles, bicycles, and pedestrians, and stationary objects such as fallen objects) in the front direction of the own vehicle and outputs information regarding the detected obstacles to a driving support device (collision prevention device, or the like) or provides a driver with the information by audio or display. A detection direction is the front direction, but may be another direction such as the side direction, the rear direction, or the like.

Figure 1:
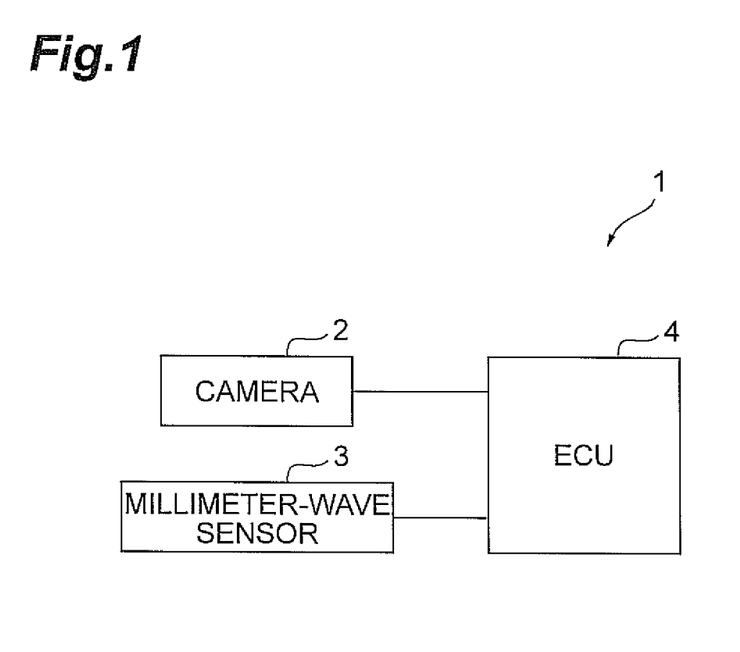
FIG. 1 is a configuration diagram of a periphery monitoring device according to this embodiment.
Figure 2:
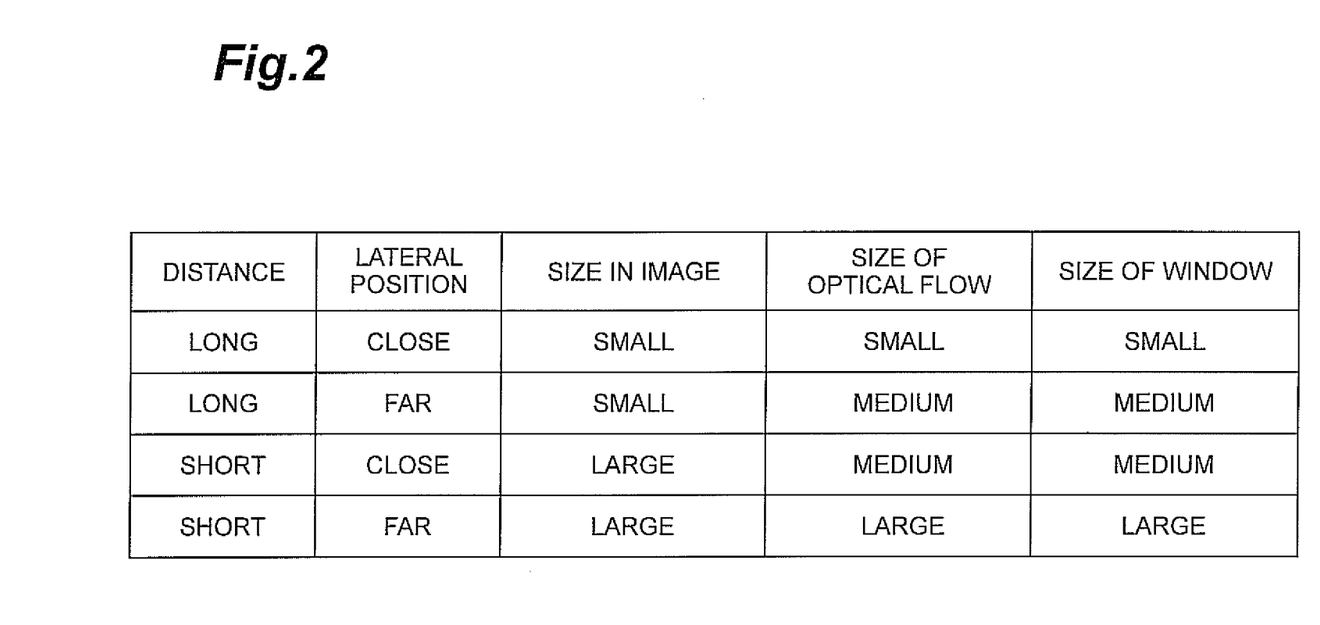
FIG. 2 is a table showing a size in a captured image, a size of an optical flow, and a size of a window for a distance and a lateral position to a feature point.
Figure 3:
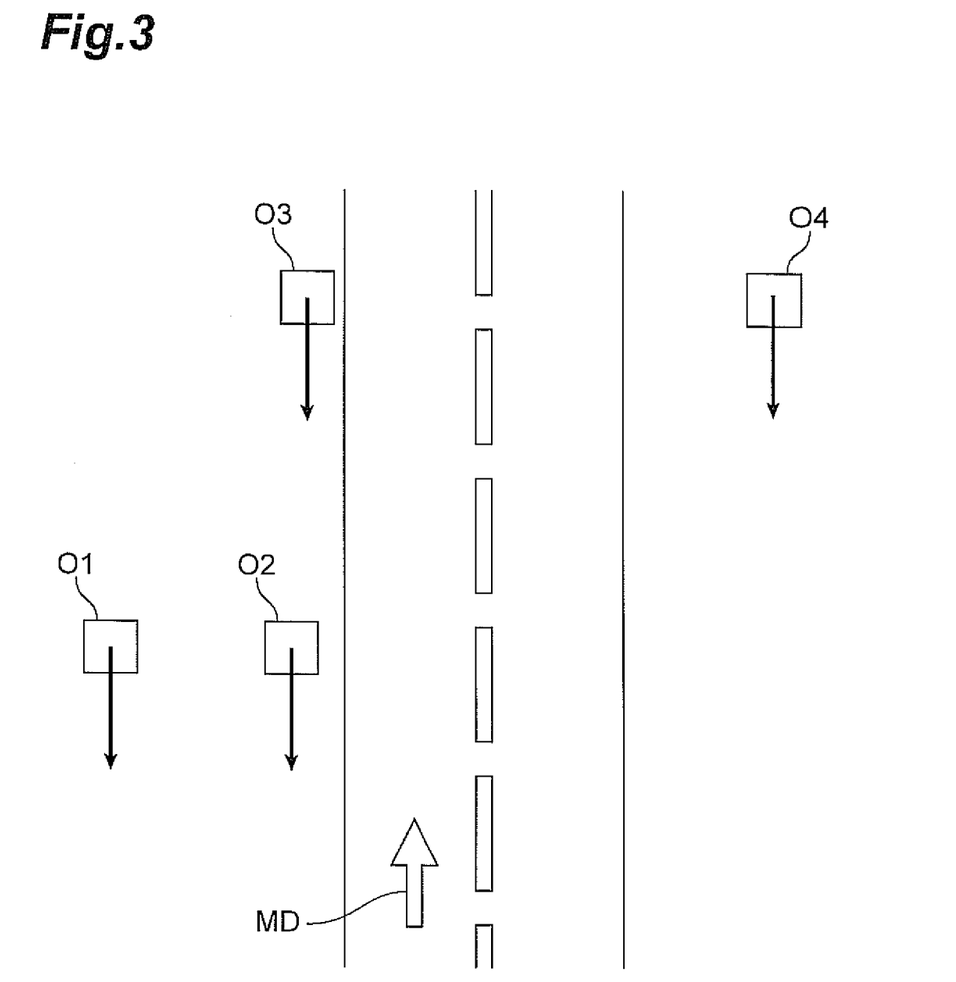
FIG. 3 is an example of a plan view showing the periphery (front side) of the own vehicle viewed from above.
Figure 4:
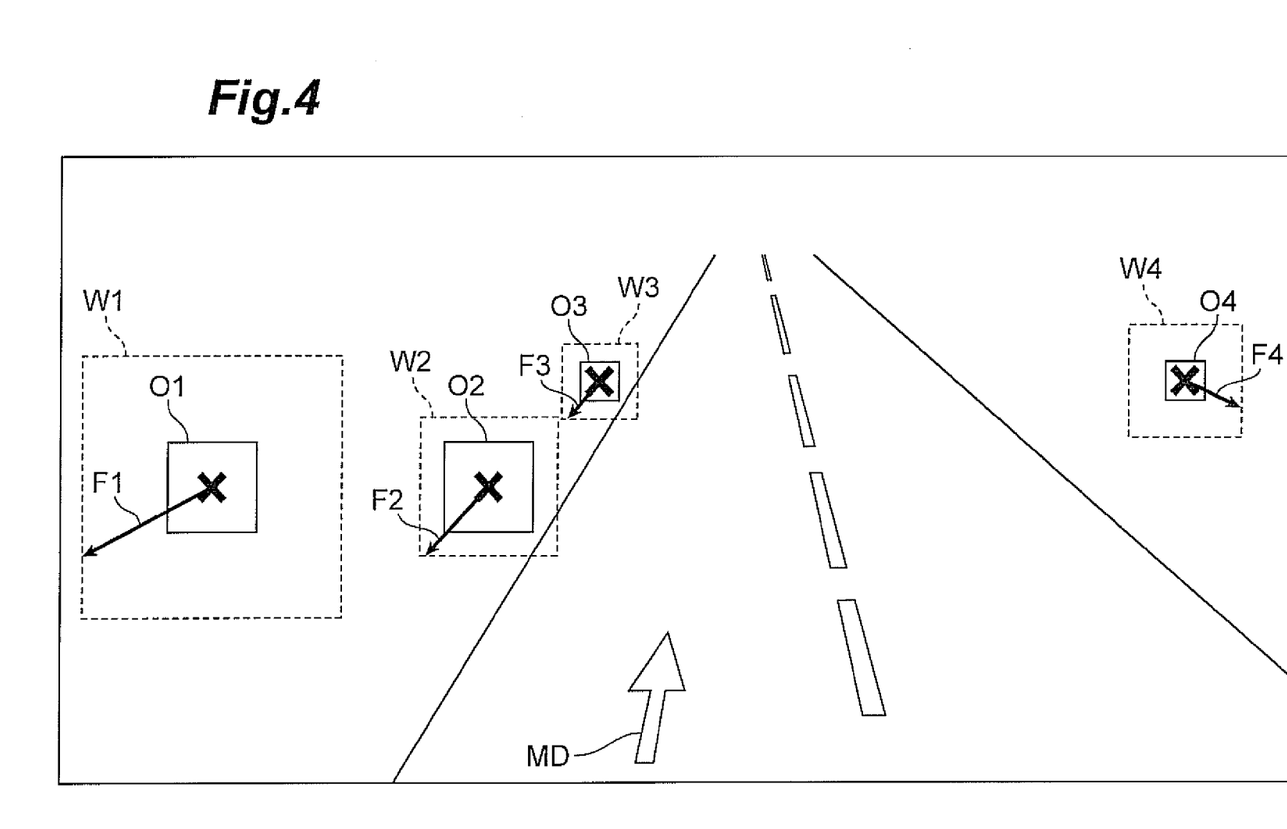
FIG. 4 is a diagram in which a window for calculating an optical flow has been set by an ECU of FIG. 1 for a captured image of the periphery of the own vehicle shown in FIG. 3.
Figure 5:
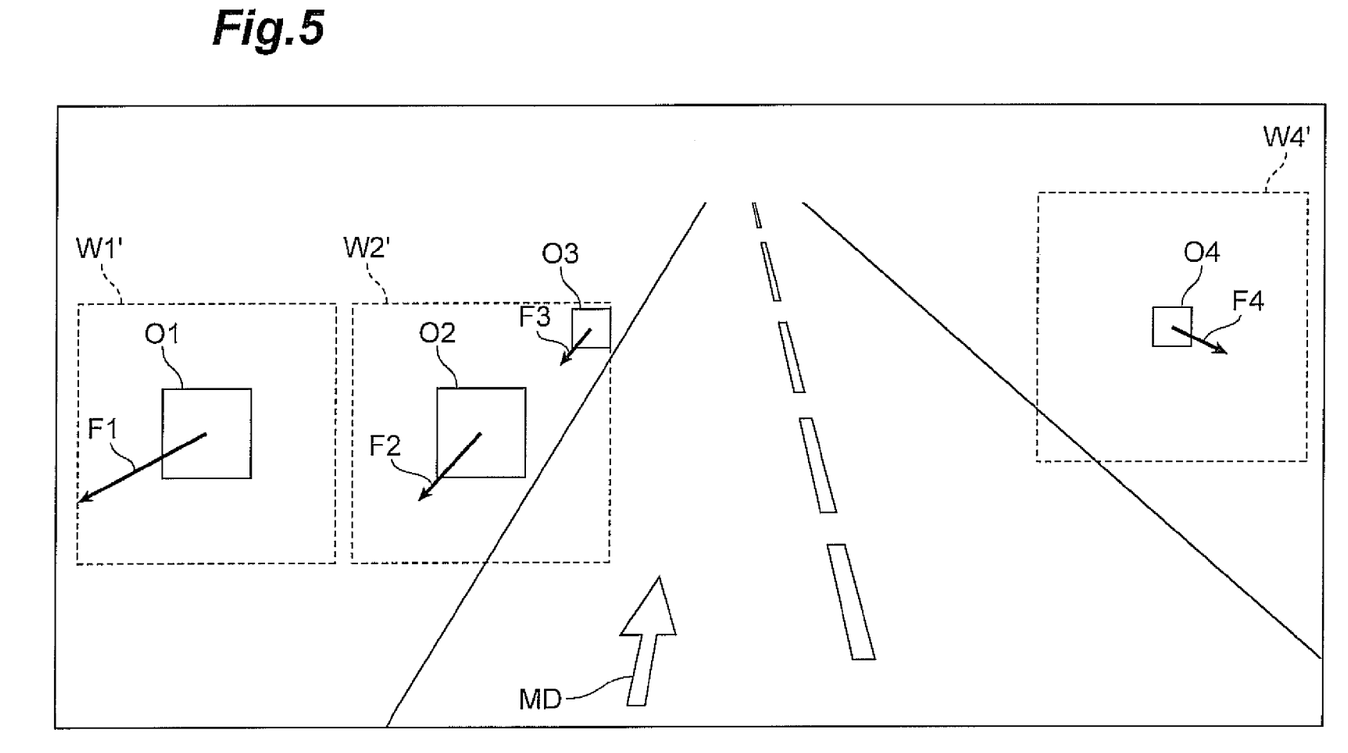
FIG. 5 is a diagram in which a window for calculating an optical flow has been set according to a related technique for the captured image of the periphery of the own vehicle shown in FIG. 3.

A periphery monitoring device 1 according to this embodiment will be described with reference to FIGS. 1 to 5. FIG. 1 is a configuration diagram of a periphery monitoring device according to this embodiment. FIG. 2 is a table showing a size in a captured image, a size of an optical flow, and a size of a window for a distance and a lateral position to a feature point. FIG. 3 is an example of a plan view showing the periphery (front side) of the own vehicle viewed from above. FIG. 4 is a diagram in which a window for calculating an optical flow has been set by an ECU of FIG. 1 for a captured image of the periphery of the own vehicle shown in FIG. 3. FIG. 5 is a diagram in which a window for calculating an optical flow has been set according to a related technique for the captured image of the periphery of the own vehicle shown in FIG. 3.

The periphery monitoring device 1 detects information regarding an obstacle on the basis of an optical flow detected from an image between temporally continuous frames. In particular, the periphery monitoring device 1 sets a window for optical flow calculation in response to a position on an image for each processing target (obstacle) so as to improve the accuracy of optical flow calculation. The periphery monitoring device 1 has a camera 2, a millimeter-wave sensor 3, and an ECU [Electronic Control Unit] 4.

In this embodiment, the millimeter-wave sensor 3 corresponds to the position acquisition means, and a process in the ECU 4 corresponds to the setting means.

The camera 2 is a camera for capturing an image in the front direction of the own vehicle. The camera 2 is attached at the center of the front side of the own vehicle. The camera 2 captures the image in the front direction of the own vehicle, and transmits information regarding the captured image as an image signal to the ECU 4. The captured image is a frame image per given time (for example, 1/30 sec).

The millimeter-wave sensor 3 is a radar sensor which detects an object using a millimeter wave. The millimeter-wave sensor 3 is attached at a predetermined height position of the center of the front side of the own vehicle (a height position at which an obstacle of a detection target is capable of being exactly detected). The millimeter-wave sensor 3 transmits millimeter waves from the own vehicle in the front direction while performing a scanning operation in the left and right directions, and receives reflected millimeter waves.

For each detection point at which the reflected millimeter-wave has been received, the millimeter-wave sensor 3 calculates a relative distance to an object in the front direction on the basis of the time from the transmission to the reception of the millimeter-wave and a millimeter-wave velocity. The millimeter-wave sensor 3 calculates a relative velocity to the object in the front direction on the basis of variation between a relative distance calculated at a current time (t) and a relative distance calculated at a previous time (t−1). The millimeter-wave sensor 3 detects the direction of the reflected strongest millimeter wave among the reflected millimeter waves, produces an angle between a traveling direction of the own vehicle and a direction of the object from the detected direction, and calculates a lateral position of the object from the angle. The millimeter-wave sensor 3 transmits a millimeter-wave signal including the detected millimeter-wave information (a relative distance, a relative velocity, a relative lateral position, or the like of each detected object) to the ECU 4. The relative distance, the relative velocity, and the lateral position may be calculated by the ECU 4. In this case, millimeter-wave information including a transmission time, a reception time, a scanning direction, and a received strength for each detection point is transmitted from the millimeter-wave sensor 3 to the ECU 4.

The ECU 4 is an electronic control unit including a CPU [Central Processing Unit], ROM [Read Only Memory], RAM [Random Access Memory], an image processing chip, and the like, and performs an integrated control operation for the periphery monitoring device 1. The ECU 4 receives an image signal from the camera 2 and a millimeter-wave signal from the millimeter-wave sensor 3 at each given time, and stores the millimeter-wave information and captured-image information in time series. The ECU 4 performs a process for detecting obstacle information using the above-described information, and outputs the detected obstacle information (for example, a relative distance, a relative velocity, a relative lateral position, a moving direction, or a moving velocity) to the driving support device, or provides the driver with the detected obstacle information.

Before the description of a specific process of the ECU 4, a size of a window for calculating an optical flow to be handled by the ECU 4 will be described. The size of an object on an image becomes large as a distance of the obstacle from the camera 2 (an image capture position) becomes short and becomes small as the distance becomes long. Therefore, it is necessary to increase the size of the window when the distance of the obstacle from the camera 2 is short and to decrease the size of the window when the distance is long, so as to optimize the window size in response to the obstacle size.

Since the own vehicle travels in the front direction where an obstacle exists, the size of an optical flow becomes small as the lateral position of the obstacle becomes close to the camera 2 and becomes large as the lateral position becomes far therefrom. Since the optical flow does not converge or the optical flow needs to be calculated a number of times by gradually shifting the small window when the optical flow is large but the small window is set, a calculation amount increases. Therefore, it is necessary to decrease the size of the window when the lateral position of the obstacle is close to the camera 2 and to increase the size of the window when the lateral position is far therefrom, so as to optimize the window size in response to the size of the optical flow.

FIG. 2 shows the above-described relationship in tabular form. When a distance from the camera 2 to the obstacle (feature point) is long and the lateral position is close thereto, a "small size" is set as the window size since its size in the image becomes small and the size of the optical flow also becomes small. When the distance is long and the lateral position is far, a "medium size" is set as the window size since the size in the image becomes small and the size of the optical flow becomes medium. When the distance is short and the lateral position is close, a "medium size" is set as the window size since the size in the image becomes large and the size of the optical flow becomes medium. When the distance is short and the lateral position is far, a "large size" is set as the window size since the size in the image becomes large and the size of the optical flow becomes large. In both the case where the distance is long and the lateral position is far and the case where the distance is short and the lateral position is close, the windows have the medium sizes, but the window sizes may be substantially the same. Alternatively, the window size may be slightly larger in the case where the distance is short and the lateral position is close.

The size of the optical flow becomes large as the velocity of the own vehicle becomes high, and the size of the optical flow becomes small as the velocity of the own vehicle becomes low. Therefore, in consideration of the velocity of the own vehicle, the window may be large when the vehicle velocity is high, and the window may be small when the vehicle velocity is low.

A process in the ECU 4 will be specifically described. The ECU 4 detects a feature point (obstacle) from a frame image at a current time (t). In the detection of the feature point, for example, edge detection is used by applying a related technique.

For each detected feature point, the ECU 4 acquires millimeter-wave information (particularly, a relative distance and lateral position) corresponding to the feature point. The ECU 4 determines whether or not the distance from the own vehicle (the camera 2) is short on the basis of the relative distance (whether or not the relative distance is equal to or less than a distance threshold). The distance threshold is a threshold for determining whether the distance to the obstacle is short or long. The distance threshold may be preset by an experiment or the like or may be set in consideration of the size of an obstacle (for example, a pedestrian) in the image. The ECU 4 determines whether or not the lateral position is close to the own vehicle (the camera 2) on the basis of the relative lateral position (whether or not the relative lateral position is equal to or less than a lateral position threshold). The lateral position threshold is a threshold for determining whether the lateral position of the obstacle is close or far. The lateral position threshold may be preset by an experiment or the like or may be set in consideration of the size of the obstacle in the image.

When it has been determined that the distance is long and the lateral position is close, the ECU 4 sets the window for calculating the optical flow to a small size. When it has been determined that the distance is long and the lateral position is far, the ECU 4 sets the window to a medium size. When it has been determined that the distance is short and the lateral position is close, the ECU 4 sets the window to a medium size. When it has been determined that the distance is short and the lateral position is far, the ECU 4 sets the window to a large size. The large, medium, and small sizes of the window may be preset by an experiment or the like, or may be set in consideration of the size of the obstacle in the image.

For each set window, the ECU 4 calculates the optical flow in the window by a gradient technique (in which it is assumed that points within windows have optical flows with the same size as a constraint) using an image between continuous frames. The optical flow calculation by the gradient technique uses a related technique.

The ECU 4 sets obstacle information from millimeter-wave information (a relative distance, a relative velocity, a relative lateral position, or the like) and an optical flow (a moving direction, a moving velocity, a moving quantity, or the like) for each feature point (obstacle). The ECU 4 outputs the obstacle information to the driving support device or provides the driver with the obstacle information. As other information of the obstacle, the size of the obstacle may be detected from the image, and the type of the obstacle may be detected using pattern recognition or the like.

In the case of the example shown in FIG. 3, the own vehicle runs on a road of one lane on one side in a direction indicated by an arrow MD, and four obstacles O1, O2, O3, and O4 (for example, pedestrians) exist in the front direction of the own vehicle. The obstacle O1 is located at a short distance from the own vehicle and is located at a lateral position far from the own vehicle. The obstacle O2 is located at a short distance from the own vehicle and also is located at a lateral position close to the own vehicle. The obstacle O3 is located at a long distance from the own vehicle and is located at a lateral position close to the own vehicle. The obstacle O4 is located at a long distance from the own vehicle and also is located at a lateral position far from the own vehicle. Here, to facilitate understanding of the description, it is assumed that the obstacles O1, O2, O3, and O4 go ahead at the same velocity in the direction of the own vehicle.

FIG. 4 shows an image captured by photographing the surrounding landscape in the front direction of the own vehicle shown in FIG. 3, and also shows a window for each obstacle (feature point) set by the ECU 4 in the image. In FIGS. 4 and 5, position detection results of the millimeter-wave sensor 3 are indicated by marks x, optical flows (in this regard, optical flows F1, F2, F3, and F4 which are not calculated in a window unit, but are ideal optical flows (excluding errors) calculated only from the obstacles O1, O2, O3, and O4) are indicated by arrows, the obstacles are indicated by solid-line rectangles, and the windows are indicated by dotted-line rectangles. In the case of the obstacle O1, the size on the image becomes large since the distance is short and the optical flow F1 becomes large since the lateral position is far, but a large-size window W1 corresponding to its size on the image and the size of the optical flow is set. In the case of the obstacle O2, the size on the image becomes large since the distance is short but the optical flow F2 becomes smaller than that of the obstacle O1 since the lateral position is close, so that a medium-size window W2, which is smaller than that of the obstacle O1, is set. In the case of the obstacle O3, the size on the image becomes small since the distance is long and the optical flow F3 is also small since the lateral position is close, but a small-size window W3 corresponding to the size on the image and the size of the optical flow is set. In the case of the obstacle O4, the size on the image becomes small since the distance is long, but the optical flow F4 becomes larger than that of the obstacle O3 since the lateral position is far, so that a medium-size window W4, which is larger than that of the obstacle O3, is set.

FIG. 5 shows an image captured by photographing the surrounding landscape in the front direction of the own vehicle shown in FIG. 3, and also shows windows set by a related technique in the image. In the related technique, windows W1', W2', and W4' having the same size are uniformly set and have a relatively large size to sufficiently include obstacles. The window 'W2' including the obstacle O2 has a large size when considering a size of an optical flow F2 and includes an obstacle O3. Therefore, optical flows of the window W2' are calculated from image information of two obstacles O2 and O3 and image information of the background and the optical flow error of the obstacle O2 becomes large. The window W4' including an obstacle O4 has an excessively large size when considering a size of the obstacle O4 or a size of an optical flow F4 on the image, and a large portion thereof is the background. Therefore, the optical flow of the window W4' is calculated from image information of the small obstacle O4 and image information of the large background, and the optical flow error of the obstacle O4 becomes large.

Figure 6:
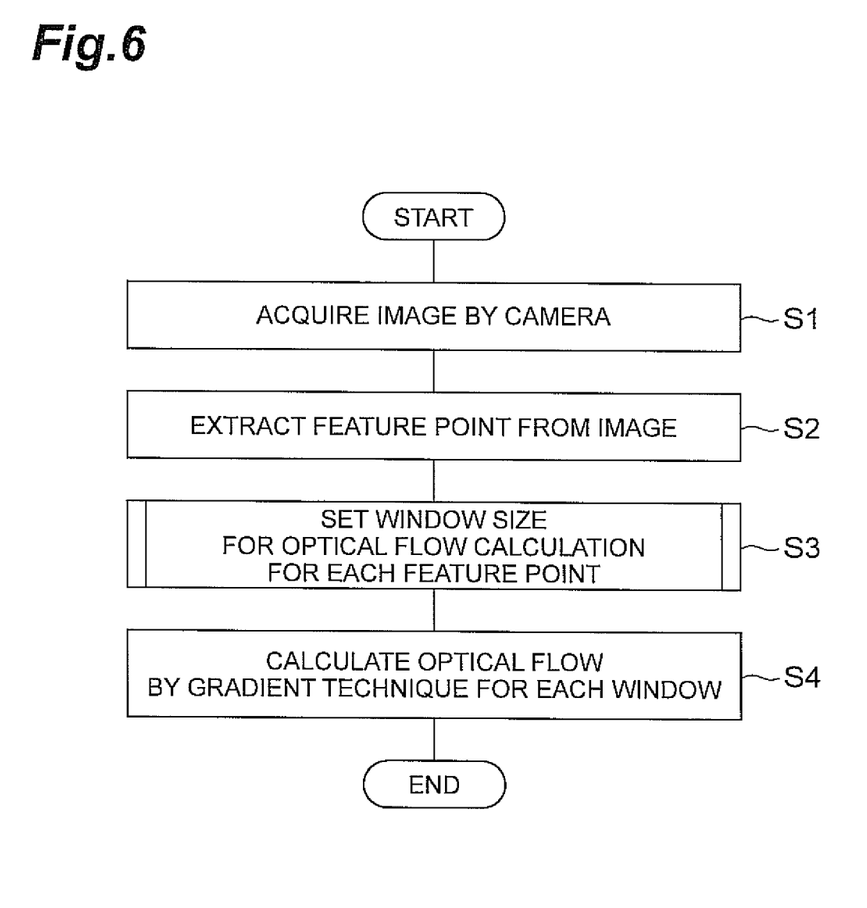
FIG. 6 is a flowchart showing a flow of a main process in the ECU of FIG. 1.
Figure 7:
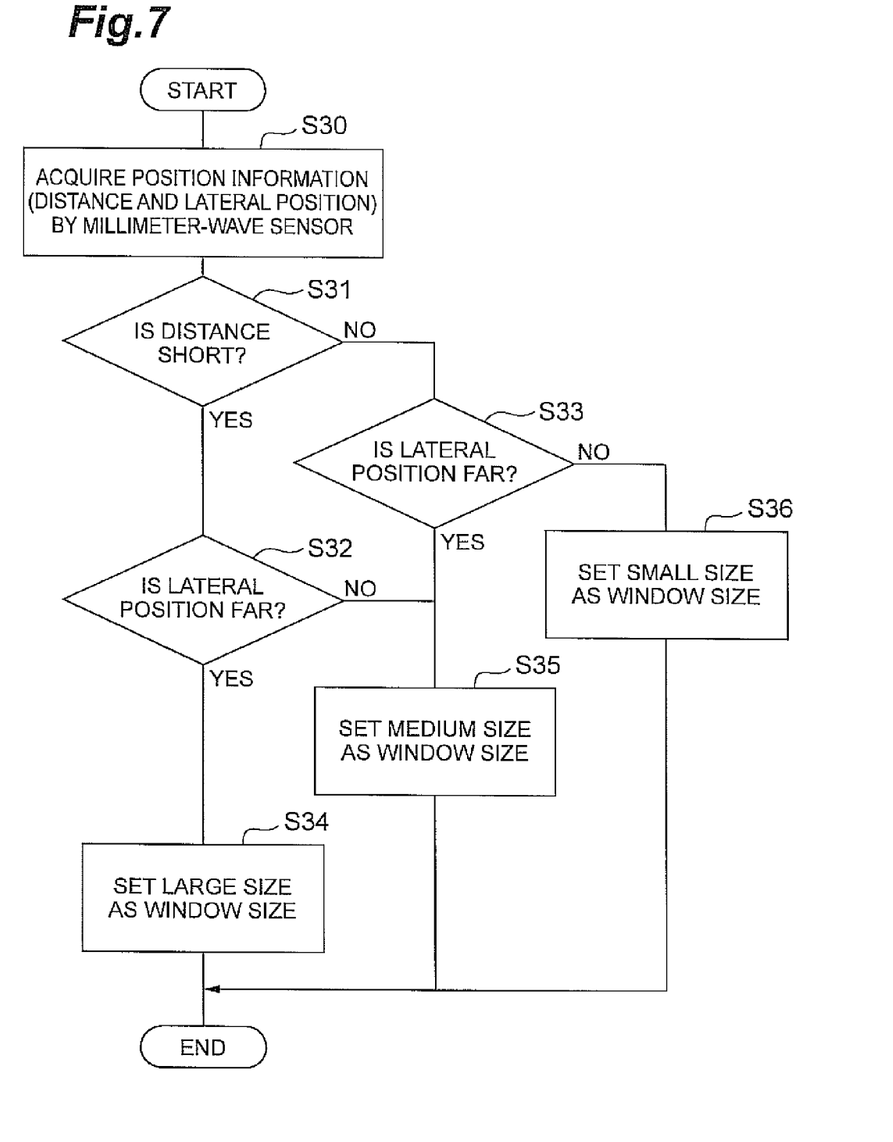
FIG. 7 is a flowchart showing a flow of a window size setting process in the ECU of FIG. 1.

The operation of the periphery monitoring device 1 will be described with reference to FIGS. 1 and 2. In particular, the process of the ECU 4 will be described according to FIGS. 6 and 7. FIG. 6 is a flowchart showing a flow of a main process in the ECU of FIG. 1. FIG. 7 is a flowchart showing a flow of a window size setting process in the ECU of FIG. 1.

At each given time, the camera 2 captures an image in the front direction of the own vehicle and transmits an image signal including the image information thereof to the ECU 4. The millimeter-wave sensor 3 performs a scanning operation by millimeter waves at each given time, calculates a relative distance, a relative velocity, a relative lateral position, or the like for each detection point, and transmits a millimeter-wave signal including millimeter-wave information of each detection point to the ECU 4.

The ECU 4 receives an image signal from the camera 2 at each given time and acquires a frame image at a current time (t) (S1). Each frame image is temporarily stored in the ECU 4 in time series. The ECU 4 extracts a feature point from the frame image at the current time (t) (S2).

For each extracted feature point, the ECU 4 sets a window for calculating an optical flow (S3). For each given time, the ECU 4 receives a millimeter-wave signal from the millimeter-wave sensor 3 and acquires the relative distance and the relative lateral position for the feature point from the millimeter-wave information (S30). The millimeter-wave information is temporarily stored in the ECU 4 in time series.

The ECU 4 determines whether or not a distance to the feature point is short (S31). When it has been determined that the distance is short in S31, the ECU 4 determines whether or not the lateral position is far (S32). When it has been determined that the distance is long in S31, the ECU 4 determines whether or not the lateral position is far (S33).

When it has been determined that the lateral position is far in S32 (that is, when the distance to the feature point is short and the lateral position is far therefrom), a large size is set as the window size (S34). When it has been determined that the lateral position is close in S32 (that is, when the distance to the feature point is short and the lateral position is close thereto), a medium size is set as the window size (S35). When it has been determined that the lateral position is far in S33 (that is, when the distance to the feature point is long and the lateral position is far therefrom), a medium size is set as the window size (S35). When it has been determined that the lateral position is close in S33 (that is, when the distance to the feature point is long and the lateral position is close thereto), a small size is set as the window size (S36).

For each set window, the ECU 4 calculates an optical flow by the gradient technique using the frame image at the current time (t) and a frame image at a previous time (t−1) (S4).

The ECU 4 extracts information regarding each obstacle from millimeter-wave information of each feature point and an optical flow of each window, and outputs the obstacle information to the driving support device or provides the driver with the obstacle information by audio or display.

The periphery monitoring device 1 sets a window size for optical flow calculation corresponding to a relative distance and a relative lateral position to the feature point (obstacle), so that the window size becomes a size corresponding to a size of the obstacle and a size of the optical flow on the image. Therefore, the effect of error by objects in the window other than an obstacle of a detection target may be reduced, so that the accuracy of optical flow calculation may be improved. Since the optical flow is calculated by a window having an exact size for each obstacle without optical flow calculation by the window uniformly having the large size, the throughput is able to be reduced.

Since the optical flow is calculated by setting a window only for a detected feature point, the periphery monitoring device 1 is able to further reduce the throughput. Since the millimeter-wave sensor 3 produces position information of each feature point with a high degree of accuracy, the periphery monitoring device 1 is able to set an exact window size from the highly-accurate position information thereof.

In the above, while the embodiment according to the present invention has been described, the present invention is not limited thereto but various modifications are possible.

For example, the periphery monitoring device, mounted on a vehicle, for detecting obstacles around the vehicle has been applied in this embodiment, but it is applicable to various image processing devices having a function of calculating an optical flow. It may be mounted on other moving objects such as a robot and the like, or may be installed in a predetermined place, not a moving object, to be applied even in the case where an image processing device side calculates an optical flow in a stationary state.

The millimeter-wave sensor has been applied as the position acquisition means in this embodiment, but the position acquisition means may be another radar sensor such as a laser sensor and the like and may be position acquisition means other than the radar.

The gradient technique has been applied to calculate an optical flow in this embodiment, but other techniques such as pattern matching and the like are also applicable to calculate the optical flow.

It has been configured that a window size is set in response to a relative distance and a lateral position between a camera (vehicle) and each feature point in this embodiment, but the window size may be set in response to only one of the distance and the lateral position or the window size may be set in response to a parameter of position information other than the distance and the lateral position.

It has been configured that a window for a processing target is set by detecting a feature point from an image and using a detection result of the millimeter-wave sensor for the feature point, but it may be configured that the window is directly set using an object detected by the millimeter-wave sensor as the processing target. The window may be set for the entire image without being limited to setting the window to the feature point.

The window size has been set in three steps (or four steps) in this embodiment, but may be set in two steps or at least five steps in response to a relative distance or lateral position. According to this, a distance threshold and a lateral position threshold may also be set in a plurality of steps.

INDUSTRIAL APPLICABILITY

The present invention is able to improve the accuracy of optical flow calculation by setting a window having an appropriate size for a processing target in response to position information of the processing target.

REFERENCE SINGS LIST

1: PERIPHERY MONITORING DEVICE
2: CAMERA
3: MILLIMETER-WAVE SENSOR
4: ECU

The invention claimed is:

1. An image processing device for calculating an optical flow on the basis of image information within a window for a processing target using a plurality of images captured at different times, comprising:
    position acquisition means which acquires position information of the processing target; and
    setting means which sets a size of a window for calculating an optical flow on the basis of the position information acquired by the position acquisition means;
    wherein the setting means increases the window size as a lateral position difference becomes larger, the lateral position difference being a difference between an image capture position where a camera is attached and a position where the processing target exists.

2. The image processing device of claim 1, wherein the position acquisition means is a radar, and
    sets the processing target on the basis of a detection result of the radar.

3. An image processing device for calculating an optical flow on the basis of image information within a window for a processing target using a plurality of images captured at different times, comprising:
    a position acquisition unit that acquires position information of the processing target; and
    an electronic control unit configured to set a size of a window for calculating an optical flow on the basis of the position information acquired by the position acquisition unit;
    wherein the electronic control unit increases the window size as a lateral position difference becomes larger, the lateral position difference being a difference between an image capture position where a camera is attached and a position where the processing target exists.

4. The image processing device of claim 3, wherein the position acquisition unit is a radar device, and
    wherein the electronic control unit sets the processing target on the basis of a detection result of the radar device.

* * * * *